(12) United States Patent
Ding et al.

(10) Patent No.: US 11,808,961 B2
(45) Date of Patent: Nov. 7, 2023

(54) TRANSPARENT CONDUCTING SURFACES FOR TERAHERTZ BANDPASS METAMATERTALS AND USES THEREOF

(71) Applicant: University of Iowa Research Foundation, Iowa City, IA (US)

(72) Inventors: Hongtao Ding, Coralville, IA (US); Qinghua Wang, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 578 days.

(21) Appl. No.: 16/740,024

(22) Filed: Jan. 10, 2020

(65) Prior Publication Data
US 2020/0225389 A1 Jul. 16, 2020

Related U.S. Application Data

(60) Provisional application No. 62/791,291, filed on Jan. 11, 2019.

(51) Int. Cl.
*G02B 5/20* (2006.01)
*B32B 17/06* (2006.01)
(Continued)

(52) U.S. Cl.
CPC .............. *G02B 5/208* (2013.01); *B32B 15/20* (2013.01); *B32B 17/061* (2013.01); *B60J 1/20* (2013.01);
(Continued)

(58) Field of Classification Search
CPC .............. G02B 1/002; G02B 5/00–5/32; B32B 17/061
See application file for complete search history.

(56) References Cited

U.S. PATENT DOCUMENTS

| 8,803,637 B1* | 8/2014 | Peralta | H01P 7/10 |
| | | | 333/204 |
| 2011/0175672 A1* | 7/2011 | Nguyen | G02B 1/002 |
| | | | 257/428 |

(Continued)

FOREIGN PATENT DOCUMENTS

CN 104493199 B 12/2016

OTHER PUBLICATIONS

Sato et al. "Transparent Terahertz Metamaterial with a Refractive Index of Zero", 2016 41st International Conference on Infrared, Millimeter, and Terahertz waves (IRMMW-THz), (2016); pp. 1-2.*

(Continued)

*Primary Examiner* — Prashant J Khatri
(74) *Attorney, Agent, or Firm* — Schwegman Lundberg & Woessner, P.A.

(57) ABSTRACT

The disclosure relates to a composite comprising a metal film having a first major surface and opposed second major surface, at least a portion of the metal film having a sheet resistance of at least 15 Ω/sq, an optical transmittance of at least 60% within the visible spectrum, and tunable bandpass filtering effect in the THz frequency range; a dielectric substrate comprising a first major surface and opposed second major surface; the metal film first major surface located on at least a portion of the dielectric substrate first major surface. The disclosure also relates to methods of making such composites and articles comprising such composites.

21 Claims, 2 Drawing Sheets

(51) Int. Cl.
  B32B 15/20 (2006.01)
  B60J 1/20 (2006.01)
(52) U.S. Cl.
  CPC ... *B32B 2307/202* (2013.01); *B32B 2307/412* (2013.01); *B32B 2307/42* (2013.01)

(56) References Cited

U.S. PATENT DOCUMENTS

| | | | | |
|---|---|---|---|---|
| 2014/0193301 | A1* | 7/2014 | Xiong | G02B 1/002 430/296 |
| 2014/0320378 | A1* | 10/2014 | Gracias | A61N 5/045 343/893 |

OTHER PUBLICATIONS

Bandaranayake, B M, "Terahertz Time Domain Spectroscopy (THz-TDS) for Solid State Analysis (Thesis)", The University of Iowa, [Online], Retrieved from the Internet: <URL: https://iro.uiowa.edu/esploro/outputs/doctoral/Terahertz-time-domain-spectroscopy-THz-TDS-for/9983777123602771 >, (2016), 247 pgs.

Bhadresha, Renu, et al., "THz Bandpass Filter Based on Sub-Wavelength Holes in Free-Standing Metal Thin-Films", 40th International Conference on Infrared, Millimeter, and Terahertz Waves (IRMMW-THz), (2015), 2 pgs.

Born, N, et al., "Freestanding Terahertz Metamaterials Fabricated by Laser Beam Machining", Cleo, p. JW2A.59, (2015), 2 pgs.

Born, N, et al., "Laser Beam Machined Free-Standing Terahertz Metamaterials", Electron Lett, 51(13), (2015), 1012-1014.

Cao, Hua, et al., "Influence of Aperture Shape on the Transmission Properties of a Periodic Array of Subwavelength Apertures", Optics Express, 12(16), (2004), 9 pgs.

Catrysse, Peter B, et al., "Nanopatterned Metallic Films for Use as Transparent Conductive Electrodes in Optoelectronic Devices", Nano Lett, 10(8), (2010), 2944-2949.

Chung, Ren-Jei, et al., "Hybrid ZnO NR/graphene Structures as Advanced Optoelectronic Devices with High Transmittance", Nanoscale Res Lett, 8(1), (2013), 5 pgs.

Eda, G., et al., "Large-area ultrathin films of reduced graphene oxide as a transparent and flexible electronic material", Nature Nanotechnology, 3, (2008), 270-274.

Ferraro, Antonio, et al., "Broad- and Narrow-Line Terahertz Filtering in Frequency—Selective Surfaces Patterned on Thin Low-Loss Polymer Substrates", IEEE J Sel Top Quantum Electron, 23(4), (2017), 8 pgs.

Gao, Meizhen, et al., "Influence of Cooling Rate on Optical Properties and Electrical Properties of Nanorod ZnO Films,", J Alloys Compd, 500(2), (2010), 181-184.

Gerke, Tim, et al., "Picosecond Fiber Laser Microfabrication of THz Wire-Grid Polarizers on Polymer Membrane Substrates", Proc SPIE, vol. 8243, (2012), 11 pgs.

Girtan, M, et al., "On the Properties of Aluminium Doped Zinc Oxide Thin Films Deposited on Plastic Substrates from Ceramic Targets", Appl Surf Sci, 274, (2013), 306-313.

Hagendorfer, H, et al., "Highly Transparent and Conductive ZnO:Al Thin Films from a Low Temperature Aqueous Solution Approach", Adv Mater, 26(4), (2014), 632-636.

Hong, S, et al., "Nonvacuum, Maskless Fabrication of a Flexible Metal Grid Transparent Conductor by Low-Temperature Selective Laser Sintering of Nanoparticle Ink,", ACS Nano, 7(6), (2013), 5024-5031.

Hu, A, et al., "Density- and Adhesion-Controlled ZnO Nanorod Arrays on the ITO Flexible Substrates and Their Electrochromic Performance", J Alloys Compd, 507(1), (2010), 261-266.

Hu, L., et al., "Percolation in Transparent and Conducting Carbon Nanotube Networks", Nano Letters, 4(12), (2004), 2513-2517.

Huang, Li-Jing, et al., "A Comparative Study of Different M(M=Al, Ag, Cu)/FTO Bilayer Composite Films Irradiated with Nanosecond Pulsed Laser", J Alloys Compd, 617, (2014), 915-920.

Huang, Li-Jing, et al., "Effect of Annealing on the Morphology, Structure and Photoelectric Properties of AZO/Pt/FTO Trilayer Films", Acta Metall Sin (English Lett, 28(3), (2015), 281-288.

Huang, Li-Jing, et al., "Enhancing Optical and Electrical Properties of Al-Doped ZnO Coated Polyethylene Terephthalate Substrates by Laser Annealing Using Overlap Rate Controlling Strategy", Ceram Int, 42(6), (2016), 7246-7252.

Huang, Li-Jing, et al., "Improvement in Overall Photoelectric Properties of Ag/FTO Bilayer Thin Films Using Furnace/laser Dual Annealing", Mater Lett, 116, (2014), 405-407.

Huang, Li-Jing, et al., "Ni/FTO Bilayer Thin Films with High Photoelectric Properties Optimized by Magnetic-Field-Assisted Laser Annealing", Mater Lett, 140, (2015), 75-78.

Im, H-G, et al., "Flexible Transparent Conducting Hybrid Film Using a Surface-Embedded Copper Nanowire Network: A Highly Oxidation-Resistant Copper Nanowire Electrode for Flexible Optoelectronics", ACS Nano, 8(10), (2014), 10973-10979.

Jeong, Jin-A, et al., "Invisible Ag Grid Embedded with ITO Nanoparticle Layer as a Transparent Hybrid Electrode", Sol Energy Mater Sol Cells, 125, (2014), 113-119.

Kang, Myung-Gyu, et al., "Nanoimprinted Semitransparent Metal Electrodes and Their Application in Organic Light-Emitting Diodes", Adv Mater, 19(10), (2007), 1391-1396.

Kim, J-Y, et al., "Using Agglomerated Ag Grid to Improve the Light Output of near Ultraviolet AlGaN-Based Light-Emitting Diode", Microelectron Eng, 169, (2017), 29-33.

Kim, Keun Soo, et al., "Large-scale pattern growth of graphene films for stretchable transparent electrodes", Nature Letters, vol. 457, (Feb. 5, 2009), 706-710.

Ko, Y H, et al., "Controllable Electrochemical Synthesis of ZnO Nanorod Arrays on Flexible ITO/PET Substrate and Their Structural and Optical Properties", Appl Surf Sci, 259, (2012), 99-104.

Lee, D, et al., "Vacuum-Free, Maskless Patterning of Ni Electrodes by Laser Reductive Sintering of NiO Nanoparticle Ink and Its Application to Transparent Conductors", ACS Nano, 8(10), (2014), 9807-9814.

Lee, J Y, et al., "Solution-Processed Metal Nanowire Mesh Transparent Electrodes", Nano Lett., vol. 8, No. 2, (2008), 689-692.

Lee, M S, et al., "High-Performance, Transparent, and Stretchable Electrodes Using Graphene-Metal Nanowire Hybrid Structures", Nano Lett, 13(6), (2013), 2814-2821.

Li, Bao-Jia, et al., "Effects of Nanosecond Laser Irradiation on Photoelectric Properties of AZO/FTO Composite Films", Appl Surf Sci, (2013), 637-641.

Li, Bao-Jia, et al., "Improving the Performance of Nickel-Coated Fluorine-Doped Tin Oxide Thin Films by Magnetic-Field-Assisted Laser Annealing", Appl Surf Sci, 351, (2015), 113-118.

Li, Bao-Jia, et al., "Surface Morphology and Photoelectric Properties of Fluorine-Doped Tin Oxide Thin Films Irradiated with 532nm Nanosecond Laser", Ceram Int, 40(1), (2014), 1627-1633.

Li, Bao-Jia, et al., "Titanium Dioxide-Coated Fluorine-Doped Tin Oxide Thin Films for Improving Overall Photoelectric Property", Applied Surface Science 290, (2014), 80-85.

Li, Bao-Jia, et al., "Two-Step Preparation of Laser-Textured Ni/FTO Bilayer Composite Films with High Photoelectric Properties", J Alloys Compd, 640, (2015), 376-382.

Lin, S, et al., "Growth and Optical Properties of ZnO Nanorod Arrays on Al-Doped ZnO Transparent Conductive Film.", Nanoscale Res Lett, 8(1), (2013), 6 pgs.

Paeng, Dongwoo, et al., "Low-Cost Facile Fabrication of Flexible Transparent Copper Electrodes by Nanosecond Laser Ablation", Adv Mater, 27(17), (2015), 2762-2767.

Ren, Nai-Fei, et al., "Introduction of Ag Nanoparticles and AZO Layer to Prepare AZO/Ag/FTO Trilayer Films with High Overall Photoelectric Properties", Ceram Int, 40(6), (2014), 8693-8699.

Ren, Nai-Fei, et al., "Laser-Assisted Preparation and Photoelectric Properties of Grating-Structured Pt/FTO Thin Films", Appl Surf Sci, 314 (2014), 208-214.

Voisiat, B, et al., "Band-Pass Filters for THz Spectral Range Fabricated by Laser Ablation", Appl Phys A Mater Sci Process, 104(3), (2011), 953-958.

(56) References Cited

OTHER PUBLICATIONS

Wang, C-T, et al., "Investigation of Surface Energy, Polarity, and Electrical and Optical Characteristics of Silver Grids Deposited via Thermal Evaporation Method", Appl Surf Sci, 360, (2016), 349-352.

Wu, Hui, et al., "A Transparent Electrode Based on a Metal Nanotrough Network", Nat Nanotechnol, 8(6), (2013), 421-425.

Yaoling, Tian, et al., "Design of 0.34 THz Bandpass Filter Based on Frequency Selective Surface", High Power Laser Part Beams, 27(12) (in Chinese with English abstract), (2015), 5 pgs.

Ye, Shengrong, et al., "Metal Nanowire Networks: The next Generation of Transparent Conductors", Adv Mater, 26(39), (2014), 18 pgs.

Zhang, Daihua, et al., "Transparent, Conductive, and Flexible Carbon Nanotube Films and Their Application in Organic Light-Emitting Diodes", Nano Lett, 6(9), (2006), 1880-1886.

\* cited by examiner

TRANSPARENT CONDUCTING SURFACES FOR TERAHERTZ BANDPASS METAMATERTALS AND USES THEREOF

CROSS-REFERENCE TO RELATED APPLICATIONS

This application claims the benefit of U.S. Provisional Appl. Ser. No. 62/791,291, filed Jan. 11, 2019, which is incorporated by reference as if fully set forth herein.

BACKGROUND

Imaging or sensing using terahertz electromagnetic radiation has emerged as a highly promising nondestructive evaluation technique for wide-ranging applications in agriculture and food science, communication, medical biology, and security screening. There is a growing need in the development of new THz devices to generate, detect and manipulate THz waves. However, it remains a challenging task for scaling up the manufacturing process of current designs of THz devices, particularly those with an ease of tuning in the THz-domain. In addition, most of the available THz materials are usually not transparent within the visible spectrum, which does not make them useful for broad applications.

It is therefore of great interest to develop a low-cost transformative manufacturing solution for THz devices, which can be functional in both visible and THz spectra with an ease of THz-domain modulating capability.

SUMMARY

The disclosure provides, among other things, laser-based metamaterial fabrication (LMF) process for high-throughput fabrication of transparent conducting surfaces on dielectric substrates, such as glass, quartz and polymers (e.g., soda lime glass, aluminosilicate glass, borosilicate glass, boroaluminosilicate glass, alkali-containing aluminosilicate glass, alkali-containing borosilicate glass, alkali-containing boroaluminosilicate glass, polycarbonate, polyimide, and acrylates/acrylics, such as polymethyl methacrylate), to achieve tunable THz bandpass characteristics. The LMF process comprises two steps: (1) applying ultrathin-film (e.g., in the order of nm as opposed to the micrometer regime) metal deposition on the dielectric substrate; and (2) creating a feature pattern on the metal film using nanosecond pulsed laser ablation. The resulting composite has newly integrated functional capabilities including: (a) highly conductive (e.g., at least 15 Ω/sq) sheet resistance, (b) optically transparent (e.g., at least 60% transmittance within visible spectrum), and (c) tunable bandpass filtering effect in the THz frequency range. The disclosure therefore describes an economical and scalable manufacturing technique capable of treating large surface area for multi-functional composites.

Such multi-functional composites will be of vital importance for design and fabrication of THz bandpass filtering devices with a variety of dielectric substrates, including glass-based substrates. For example, the composites and methods described herein can be fashioned into THz optics or windows having at least three, practical features in a single device: (i) electronic tuning or heating functions (e.g., for applications in, among other places, automotive and airplane windows where camouflage and signal reception/filtering might be desirable); (ii) visible transparency; and (iii) electrical conductivity that are maintained after integration with a THz device.

DESCRIPTION OF THE DRAWINGS

The drawings illustrate generally, by way of example, but not by way of limitation, various embodiments discussed herein.

Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", "bottom", "upper", "lower", "under", "over", "front", "back", "up" and "down", and "first" and "second" may be used in this disclosure, it should be understood that those terms are used in their relative sense only unless otherwise noted.

DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

The instant disclosure relates to a composite comprising:
a metal film having a first major surface and opposed second major surface, at least a portion of the metal film having a sheet resistance of at least 15 Ω/sq, an optical transmittance of at least 60% within the visible spectrum, and tunable bandpass filtering effect in the THz frequency range (e.g., wherein the THz frequency range is from about 0.3 THz to about 3 THz);
a dielectric substrate comprising a first major surface and opposed second major surface;
the metal film first major surface located on at least a portion of the dielectric substrate first major surface.

For example, a portion of the metal film or substantially the entire metal film can have a sheet resistance of at least 15 Ω/sq, at least 20 Ω/sq, at least 30 Ω/sq, at least 40 Ω/sq, such as a sheet resistance of from about 15 Ω/sq to about 50 Ω/sq, about 15 Ω/sq to about 30 Ω/sq, about 20 Ω/sq to about 40 Ω/sq, about 25 Ω/sq to about 30 Ω/sq or about 15 Ω/sq to about 30 Ω/sq. In addition, or alternatively, the metal film can have an optical transmittance of at least 60%, at least 70%, at least 80%, at least 90%, at least 95%, at least 99% or higher, such as from about 60% to about 100%, from about 60% to about 90%, about 60% to about 80%, about 75% to about 90% or about 70% to about 90%, within the visible spectrum (e.g., from about 350 nm to about 800 nm). In some examples, the optical transmittance is at least 70% from about 380 nm to about 700 nm.

In some examples, substantially the entire metal film has a sheet resistance of at least 15 Ω/sq, an optical transmittance of at least 70% within the visible spectrum, and tunable bandpass filtering effect in the THz frequency range (e.g., wherein the THz frequency range is from about 0.3 THz to about 3 THz).

A portion of the metal film or substantially the entire metal film can have a THz transmission of at least about 30% (e.g., at least about 40%, at least about 50%, at least about 60%, at least about 70%, such as from about 30% to about 70%, about 40% to about 60%, about 35% to about 55%, about 55% to about 65% or about 30% to about 60%) from about 0.1 THz to about 10 THz (e.g., from about 0.5 THz to about 3 THz, from about 1 THz to about 3 THz, about 1.5 THz to about 2.5 THz, about 1 THz to about 2.5 THz, about 0.5 THz to about 2.5 THz or about 1.5 THz to about 3 THz).

The metal film of the composites of the instant disclosure has a tunable bandpass filtering effect in the THz frequency range. As used herein, the term "tunable bandpass filtering effect in the THz frequency range" generally means that the key THz transmission properties (e.g., location of resonance frequency and transmission intensity) of the LMF-built metasurfaces described herein can be modulated by applying an external physics field (e.g., at least one of electric field, magnetic field, and mechanical deformation). Thus, for example, the THz filtering effect difference of the composites described herein can be a frequency shift of at least 0.2 THz and a at least a 10% reduction in THz transmission intensity with an applied bias voltage, such as an applied voltage of 10 V.

Figure 1:
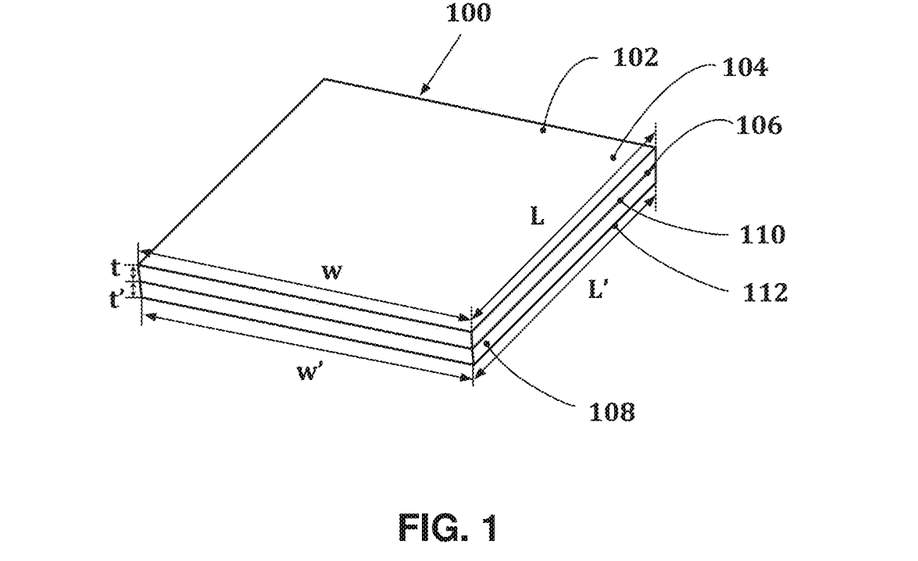
FIG. 1 is a perspective view illustration of a composite according to one or more embodiments, where a metal film substantially covers the entire surface of a substrate.

Making reference to FIG. 1, the metal film 102 of the composites 100 of the instant disclosure can have a thickness (t) that is substantially constant and is defined as a distance between the first major surface 104 and the second major surface 106. The thickness (t) as used herein refers to the maximum thickness of the metal film.

The metal film of the composites of the instant disclosure can have any suitable thickness (t), such as a thickness, measured at the thickest point in the metal film, that is less than about 100 nm (e.g., 90 nm, less than 80 nm, less than 70 nm, less than 50 nm, less than 25 nm, less than 15 nm, less than 5 nm, less than 1 nm, such as from about 1 nm to about 100 nm, about 0.1 nm to about 10 nm, about 0.1 nm to about 100 nm, about 0.5 nm to about 5 nm, about 0.5 nm to about 10 nm, about 5 nm to about 50 nm, about 10 nm to about 80 nm or about 25 nm to about 75 nm).

As shown in FIG. 1, the metal film 102 includes a width (W) defined as a first maximum dimension of one of the first or second major surfaces orthogonal to the thickness (t), and a length (L) defined as a second maximum dimension of one of the first or second surfaces orthogonal to both the thickness and the width. The dimensions discussed herein can be average dimensions.

The metal film 102, for example, can have a width (W) in a range from about 1 cm to about 250 cm, from about 5 cm to about 20 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

The metal film 102 can also have a length (L) in a range from about 5 cm to about 250 cm, from about 30 cm to about 90 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

Making reference to FIG. 1, the dielectric substrate 108 of the composites 100 of the instant disclosure can have a thickness (t') that is substantially constant and is defined as a distance between the first major surface 110 and the second major surface 112. The thickness (t') as used herein refers to the maximum thickness of the glass substrate.

The dielectric substrate 108 of the composites of the instant disclosure can have any suitable thickness (t'), such as a thickness, measured at the thickest point in the dielectric substrate, that is less than about 5 mm (e.g., less than about 2.5 mm, less than 1 mm, less than 0.5 mm, such as from about 0.5 mm to about 5 mm, about 0.5 mm to about 1.5 mm, about 1 mm to about 3 mm, about 1 mm to about 2 mm or about 1 mm to about 3 mm).

As shown in FIG. 1, the dielectric substrate 108 includes a width (W') defined as a first maximum dimension of one of the first or second major surfaces orthogonal to the thickness (t'), and a length (L') defined as a second maximum dimension of one of the first or second surfaces orthogonal to both the thickness and the width. The dimensions discussed herein can be average dimensions.

The dielectric substrate 108, for example, can have a width (W') in a range from about 1 cm to about 250 cm, from about 5 cm to about 20 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

The dielectric substrate 108 can also have a length (L') in a range from about 5 cm to about 250 cm, from about 30 cm to about 90 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

Figure 2:
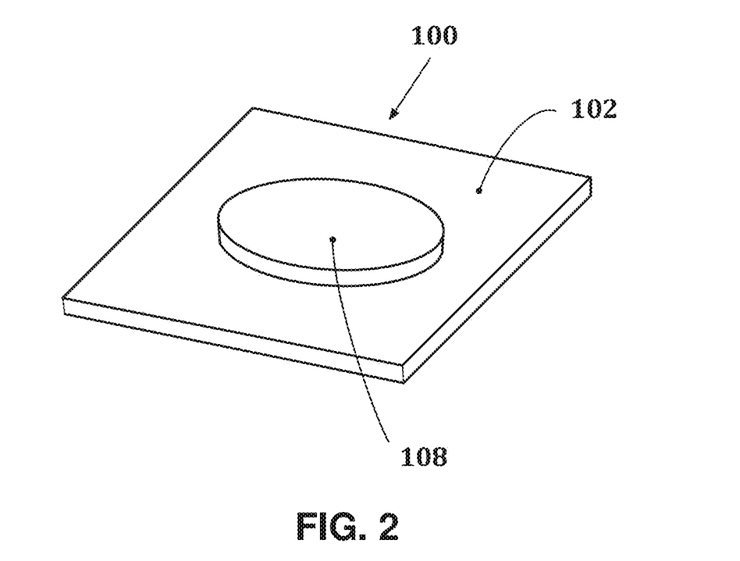
FIG. 2 is a perspective view illustration of a composite according to one or more embodiments, where a metal film covers only a portion of a surface of a substrate.

The metal film 102 can cover a portion or portions of the dielectric substrate 108, as shown in FIG. 2 or the metal film 102 can cover substantially the entire dielectric substrate 108 as shown in FIG. 1.

The metal film 102 of the composites 100 of the instant disclosure can be formed of any suitable metal and alloys thereof. Thus, for example, the metal film of the composites of the instant disclosure can be formed of copper (Cu), silver (Ag), gold (Au) or aluminum (Al) or alloys thereof.

The dielectric substrate 108 of the composites 100 of the instant disclosure can be formed of any suitable inorganic, organic or hybrid (e.g., organo silicates) dielectric material including oxides, nitrides, and halides, such as silicon dioxide ($SiO_2$), silicon nitride ($SiO_3N_4$), rubidium bromide (RbBr), lithium fluoride (LiF), barium titanate ($BaTiO_3$), lead titanate ($PbTiO_3$), hafnium oxide ($HfO_2$), tantalum oxide ($TaO_5$), tungsten oxide ($WO_3$), and zirconium oxide ($ZrO_2$); as well as polyimide, polybenzoxazole (PBO), benzocyclobutene, polytetrafluoroethylene (PTFE), polyethylene terephthalate (PET) and/or the like.

Once again making reference to FIG. 1, the metal film 102 and the dielectric substrate 108 can be in direct contact. Composites where the metal film 102 and the dielectric substrate 108 are in direct contact can be formed using methods known in the art, including by e-beam evaporation, magnetron sputtering, plating, spin coating, chemical vapor deposition (CVD) (e.g. low pressure CVD, plasma-enhanced CVD, and very low pressure CVD), and atomic layer deposition. But there can be at least one layer 114 separating the metal film 102 and the dielectric substrate 108. The at least one layer 114 separating the metal film and the dielectric substrate can be an adhesive interlayer. The at least one layer can be formed from, among other materials, adhesives, such as LOCTITE® DSP 3192, LOCTITE® 5192DM, LOCTITE® 5192, and LOCTITE® DSP 3195DM, available from Henkel Corp.; optically clear adhesive 821X available from 3M; or pressure-sensitive adhesives.

The at least one layer 114 separating the metal film and the dielectric substrate can also be a layer comprising a metal or a metal oxide (e.g., a metal, such as Ti or Cr; or a metal oxide, such as ZnO or $SiO_2$), which can act to, among other things, strengthen the bond of the metal film 102 to the dielectric substrate.

The disclosure also relates to methods of making the composites described herein, the methods comprising:

depositing the metal film on the substrate first major surface; and laser patterning at least a portion of the metal film second major surface.

The depositing can be achieved by any method known in the art, including formed using methods known in the art, including by e-beam evaporation, magnetron sputtering, plating, spin coating, chemical vapor deposition (CVD) (e.g. low pressure CVD, plasma-enhanced CVD, and very low pressure CVD), and atomic layer deposition.

The laser patterning can be achieved by any method known in the art, including by with a laser beam from a Q-Switched Nd:YAG nanosecond laser, such as a 1,064 nm wavelength Q-Switched Nd:YAG nanosecond laser.

The laser patterning can be performed on at least one portion of the metal film for at least one of a suitable amount of time, a suitable laser pulse energy, scan rate relative to the metal film, and repetition rate necessary to, among other things, produce a metal film having a sheet resistance of at least 15 Ω/sq, an optical transmittance of at least 60% within the visible spectrum, and tunable bandpass filtering effect in the THz frequency range (e.g., wherein the THz frequency range is from about 0.3 THz to about 3 THz). For example, the laser patterning of, e.g., a portion of the of the metal film can be conducted with at least one of a laser pulse lasting at least 1 ns (e.g., at least 10 ns, at least 100 ns, at least 1 μs, such as from about 1 ns to about 1 μs, about 1 ns to about 100 ns, about 1 ns to about 500 ns, about 250 ns to about 1 μs, about 500 ns to about 5 μs, about 1 μs to about 500 μs or about 500 μs to about 1 s); a laser pulse having a pulse energy of at least 1 mJ (e.g., at least 5 mJ, at least 10 mJ, at least 50 mJ, such as from about 1 mJ to about 10 mJ, about 1 mJ to about 50 mJ, about 10 mJ to about 50 mJ, about 25 mJ to about 50 mJ or about 5 mJ to about 20 mJ); a scan rate relative to the metal film of up to 5 m/s; and a repetition rate of at least 10 Hz (e.g., at least 20 Hz, at least 50 Hz, at least 100 Hz, such as from about 10 Hz to about 100 Hz, about 25 Hz to about 50 Hz, about 100 Hz to about 500 Hz, about 250 Hz to about 1 kHz, about 500 Hz to about 1 kHz, about 1 kHz to about 20 kHz, about 10 kHz to about 20 kHz or about 5 kHz to about 20 kHz).

The laser patterning can be performed on at least one portion of the metal film for at least one of a suitable amount of time, a suitable laser pulse energy, and repetition rate necessary to, among other things, produce a metal film having a sheet resistance of at least 15 Ω/sq, an optical transmittance of at least 60% within the visible spectrum, and tunable bandpass filtering effect in the THz frequency range (e.g., wherein the THz frequency range is from about 0.3 THz to about 3 THz); without substantially thermally damaging the substrate.

The disclosure also relates to articles comprising the composites described herein, optionally made by the methods described herein. Such articles include THz devices, including sensors, tunable far-infrared filters, optical switching modulators, metamaterial absorbers, THz imagers, compact cavities, adaptive optics and lenses, tunable mirrors, isolators, and converters. Such devices can be incorporated into a variety of structures, including windows, such as windows used in the automotive and home construction windows.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

EXAMPLES

It is understood that the examples and embodiments described herein are for illustrative purposes only and that various modifications or changes in light thereof will be suggested to one skilled in the art without departing from the scope of the present disclosure.

Laser-Based Metamaterial Fabrication

Various thin film deposition processes and materials have been experimentally evaluated in order to provide a viable fabrication solution of ultrathin-film metal deposition for laser-based metamaterial fabrication (LMF). Two different metals, copper (Cu) and aluminum (Al), and two different glass-based substrate materials, soda-lime glass (abbreviated as "glass") with a thickness of 1 mm and quartz with a thickness of 500 μm, were used respectively as metal film and substrate materials. Two different film deposition methods were respectively used for Cu and Al. For coating of the substrate with Cu film, pure Cu was deposited using the Angstrom Engineering's 6-pocket e-beam evaporator system. During the E-beam evaporation process, the thickness of the deposited metal was monitored in-situ by a piezoelectric thickness monitor. No intermediate layer (e.g., at least one layer 114 separating the metal film 102 and the dielectric substrate 108) was used on the substrate before the E-beam deposition process as it appeared that the Cu film did not detach from the glass-based substrate even after a long time storage in air.

For coating the substrate with Al film, pure Al was deposited using the direct current (DC) magnetron sputtering technique. The deposition facility used was an IntlVac-Nanochrome I Sputterer. During the DC magnetron sputtering process, the power was set at 400 W and the Ar gas flow rate was 16.5 sccm. Using these two deposition techniques respectively, Cu and Al films with thickness of around 10 nm were deposited onto the substrates.

Figure 3:
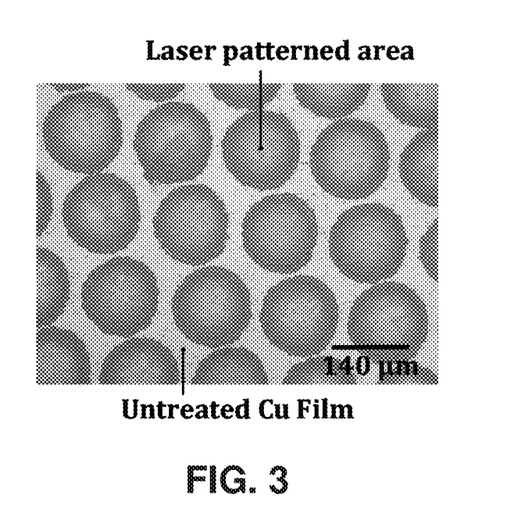
FIG. 3 is an optical image of an LMF surface patterned on an 8 nm-thick Cu film.

A 1,064 nm wavelength Q-Switched Nd:YAG nanosecond laser was selected for the second step of laser patterning. A 3-axis galvanometer laser scanner (SCANLAB intelliSCAN® 20 and varioSCANde 40i), configured with an f-theta objective, served to direct the laser beam with a beam size of ~100 μm onto the sample. The substrate materials of glass or quartz were highly transparent at this laser wavelength and hence absorbs little laser energy during patterning. It was determined that the long pulse mode of 120 ns duration with a pulse energy on the order of hundreds of mJ would be appropriate for laser patterning of the ultrathin film. The nanosecond laser ablation/patterning of Cu thin films enabled material removal without inducing thermal damage of the underlying glass or quartz substrate, allowing for the metallic micro-hole array to be directly produced on the substrate. An optical micrograph of the laser patterned micro-hole array pattern is shown in FIG. 3. The current LMF process used a laser line spacing of ~150 μm and a processing speed of ~1.5 mm/s. It is noted that this work applied a high energy nanosecond laser with a repetition rate of 10 Hz. The processing speed can be substantially increased by adopting higher pulse repetition lasers. A 36 mm×36 mm area could be fabricated within 6 s using a nanosecond laser with a typical 10 kHz repetition rate. The high throughput of our laser texturing technique will enable large-area processing for industrial applications.

Sheet Resistance

The sheet resistance was quantitatively measured to demonstrate the electrical conductivity of the LMF-built specimens. Four-point probe sheet resistivity measurements were firstly performed for the as-deposited ultrathin Al and Cu films with varying thickness utilizing a Signatone Pro4 series system. For the as-deposited Al film, as the film thickness increased from 8 nm to 15 nm, the sheet resistance gradually decreased from 12.0 $\Omega$/sq to 6.0 $\Omega$/sq. For the as-deposited Cu film, as the film thickness increased from 6.5 nm to 15 nm, the sheet resistance gradually decreased from 11.0 $\Omega$/sq to 2.4 $\Omega$/sq. It can be found that the as-deposited Cu film has lower sheet resistance than as-deposited Al film with same film thickness because Cu has better electrical conductivity than Al.

The sheet resistance of the LMF-built samples varies with the laser pattern. A key parameter is areal density, which means the ratio of residual area after LMF process over the total area. As the areal density increased from 0.32 to 0.56, the sheet resistance decreased from 21.7 $\Omega$/sq to 10.9 $\Omega$/sq for the laser patterned 8 nm-thick Cu thin film. Compared with the as-deposited Cu film, the sheet resistance of the 8 nm-thick laser patterned Cu film increased as significant amount of metal was removed during laser patterning. However, the increase is still within a reasonable range. It should be noted that sheet resistance on the order of ~30 $\Omega$/sq for a transparent conductor is comparable to ITO, a common transparent conducting oxide and suitable for use in optoelectronic devices.

Visible Transmittance

Figure 4:
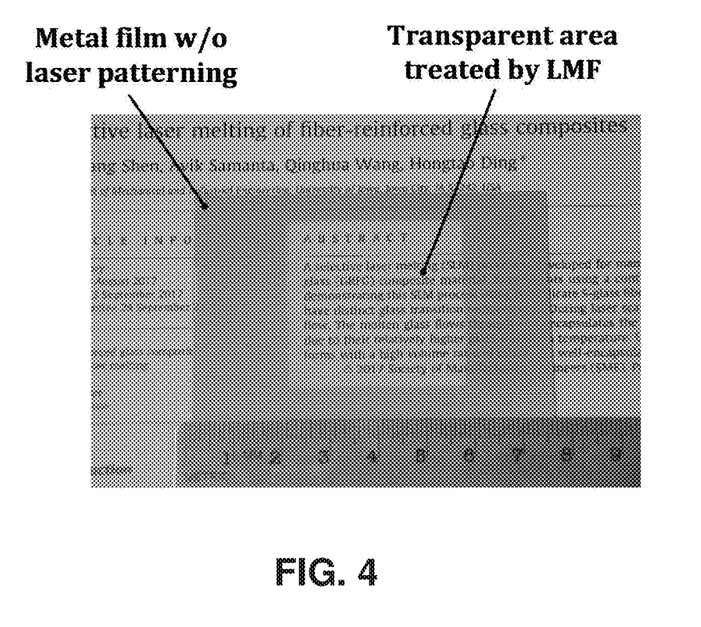
FIG. 4 is a photograph of an LMF surface placed on the text of a research paper illustrating its high visible transmittance. The size of the LMF surface is 36 mm×36 mm.

Optical transparency of the LMF-built sample is demonstrated by clear texts seen through a typical LMF-built sample area of 36 mm×36 mm. FIG. 4. The effects of various metal films and thickness were firstly experimentally evaluated by performing transmittance measurements using a UV-Vis spectrometer (USB4000, Ocean Optics). Cu films with thicknesses of 15 nm, 12 nm, 10 nm, 8 nm and 6.5 nm were deposited on a glass substrate. The as-deposited Cu film with a thickness of 15 nm only has an average visible transmittance of 23.8% in the visible wavelength range of 450 nm to 800 nm. When the thickness of Cu film was reduced to 10 nm and 8 nm, the average visible transmittance increased to 37.7% and 50.1% respectively. With the thickness of Cu film further reduced to 6.5 nm, the average visible transmittance increased further to 55.7%.

The Cu film thickness can be further reduced to ensure that the as-deposited Cu film has an average visible transmittance of 60% in the visible wavelength range of 450 nm to 800 nm with satisfying sheet resistance. The film thickness can be selected in order to maintain balance between the sheet resistance and visible transmittance on the as-deposited film.

Average visible transmittance of Al films with thicknesses of 8 nm, 10 nm and 15 nm deposited on the glass substrate were determined. The average visible transmittance of the 15 nm-thick Al film was 1.9%. When the thickness of Al film was reduced to 10 nm and 8 nm, the average visible transmittance increased to 3.7% and 17.4% respectively. It can be found the as-deposited Cu film has higher average visible transmittance that as-deposited Al film with same film thickness. Combined with the sheet resistance results, it can be concluded that Cu film is a suitable material choice for LMF as it helps achieve suitable combined photoelectric properties on the LMF surface.

Areal density of laser patterning is a parameter for the visible transmittance. As the areal density decreased from 0.56 to 0.32, the average visible transmittance increased from 56.2% to 67.2%. The average visible transmittance of the as-deposited 8 nm-thick Cu thin film is 50.1%. Laser patterning process increased the average visible transmittance by 17.1% using an areal density of 0.32. The LMF surface with the areal density of 0.32 also has a sheet resistance of 21.7 $\Omega$/sq, demonstrating superior photoelectric properties.

This demonstrates the importance of metal film thickness for achieving suitable visible transmittance and electrical conductivity, as they can be opposing properties for laser patterned films. On the one hand, the visible transmittance of the as-deposited metal film decreases as the film thickness increases. On the other hand, the electrical conductivity increases as the film thickness increases. For the as-deposited Cu film, as the film thickness increased from 6.5 nm to 15 nm, the sheet resistance gradually decreased from 11.0 $\Omega$/sq to 2.4 $\Omega$/sq. Thus even though lower thickness of the as-deposited metal film is preferred for achieving a good optical transparency, low sheet resistance with a good amount of conducting material also needs to be considered.

THz Bandpass Filtering Effect

The THz transmission of different surfaces was measured, including pure quartz and glass substrates, quartz and glass substrates coated with 8 nm-thick Cu film and laser patterned Cu films on the quartz substrates utilizing the 1000D TeraView THz-Time Domain Spectrometer.

The time-domain waveforms corresponding to the transmitted THz pulses through different interfaces were collected. The temporal scan window was set large enough in order to accurately obtain the linewidths of the resonance features. By comparing the waveforms of air reference, pure quartz substrate, and quartz substrate coated with 8 nm-thick Cu film, notable different features can be found in these time-domain traces. First an apparent time delay could be found for the bipolar pulse feature in the waveform of pure quartz substrate compared with that of air reference because of the difference in their refractive indexes. Second, the air reference waveform exhibits an almost one cycle pulse which corresponds to the incident THz wave. For the waveforms of pure quartz substrate and quartz substrate coated with 8 nm-thick Cu film, there are several etalons after bipolar pulse. In comparison with the waveforms of pure quartz substrate and quartz substrate coated with 8 nm-thick Cu film, it appears that there are damped oscillatory waveform features present in the waveforms for laser patterned Cu film and the spectral features of the transmission resonances are contained in these oscillations. These oscillations can be attributed to the resonant interaction of the THz pulse with the periodic surface structure patterned on Cu film. In general, the magnitude of the oscillations corresponds to the magnitude of the resonance feature, while the oscillation duration corresponds to the linewidth of that feature. It is apparent that the bipolar pulse feature in the waveforms of laser patterned Cu film shows a sign reversal relative to the waveform of pure quartz substrate. The sign reversal can be potentially attributed to the significant reshaping due to diffraction caused by the interaction between the incident THz pulse and laser patterned periodic hole array structure. As a result of this reshaping process, the transmitted THz pulse might exhibit an additional $\pm\pi/2$ phase shift in the low frequency limit. Thus the sign reversal of the transmitted time domain waveform would correspond to the phase shift imparted to a THz pulse transmitted through the laser patterned periodic hole array structure.

The THz transmission spectra of the pure quartz and glass substrates, the quartz and glass substrates coated with 8 nm-thick Cu film, and the laser patterned Cu films on quartz substrate were collected by THz-Time Domain Spectroscopy (THz-TDS) technique. Experimental results indicate that the pure quartz substrate has an average THz transmission of 75% in the frequency range of 0.3~3 THz. However, the pure glass substrate only has an average THz transmission of 33% in the frequency range of 0.3~3 THz and its THz transmission intensity profile exhibits a significant drop in this frequency range. After 8 nm-thick Cu film was deposited on the pure quartz and glass substrates, the average THz transmission was decreased to 3% in the frequency range of 0.3~3 THz for both of the substrates. To achieve THz filtering effect, it is required that the THz transmission profiles between the pure quartz substrate and 8 nm-thick Cu film coated on quartz substrate should have significant difference. The reason could be attributed to that if no difference can be found between these two transmission profiles, no transmission peak can be generated after laser patterning. Therefore our research showed that quartz is more suitable as the substrate required for achieving THz filtering effect. Thus in order to achieve the best combined properties of high transmittance, low sheet resistance and THz filtering effect, quartz and Cu are selected as the substrate material and metal film material respectively.

It should be noted that this work utilized ultra-thin metal film with a thickness on the order of ~10 nm to efficiently block the THz wave. Although the AC complex conductivity of metals at THz frequencies is known for many decades, the skin depths of metals reported in literature are on the order of ~100 nm. However, the thickness of the metal film used in this work is on the order of ~10 nm, which is one magnitude lower than those reported in literature.

For the LMF experiments, two different sets of experimental parameters were used for laser patterning of Cu film: Pattern 1 used a laser beam diameter of 115 μm, a hole spacing of 135 μm and an areal density of 0.43; Pattern 2 used a laser beam diameter of 115 μm, a hole spacing of 160 μm and an areal density of 0.59. After LMF process, the LMF surfaces exhibited clear THz filtering effect with specific resonance frequency and the resonance frequency could be tuned by changing the experimental parameters. Since the Cu film was deposited on the quartz substrate, there are three interfaces surrounded this stacked structure: metal-air interface, quartz-air interface and metal-quartz interface. The metal-air interface and quartz-air interface were ignored when calculating the location of the resonant transmission peaks. The quartz substrate causes a downward shift in resonant frequency, which reaches a limiting value scaled by the square root of the mean dielectric constant 63. The equation that is used to calculate the approximate locations of the resonant transmission peaks is defined as Equation (1):

$$\lambda_{peak} = \frac{P}{\sqrt{i^2+j^2}}\sqrt{\varepsilon} \quad (1)$$

where P is the physical periodicity, ε=3.7~4.2 is the dielectric constant of the interfacial dielectric media for metal-quartz interface, and i and j are indices corresponding to the resonance order.

Using the above equation for calculation of the resonant transmission peaks and conversion between wavelength and frequency, the approximate locations of the resonant transmission peaks for both experimental conditions will be: 1.08~1.16 THz (wavelength of 259.7~276.7 μm) for Pattern 1 and 0.91~0.97 THz (wavelength of 307.8~327.9 μm) for Pattern 2. The experimental results indicate that the resonant transmission peak occurs at 1.09 THz (wavelength of 274.5 μm) for Pattern 1 and 0.90 THz (wavelength of 333.1 μm) for Pattern 2. The experimental results and theoretical calculations exhibit good agreement.

The experimental results show a secondary resonant transmission peak and a rather wide FWHM bandwidth, which is caused due to the following laser patterning defects. Firstly, laser patterned hole array exhibited distinct aperiodic nature, as can be found in FIG. 3. The imperfect periodicity of the laser pattered hole array was caused by the manufacturing inaccuracy during LMF process. Secondly it can be found that the geometry of the laser patterned spot is not perfectly circular. Thirdly, there are burrs generated around the hole circumference after LMF process, as discussed in the previous section. These burrs exhibit distinct heat-affected zones and will cause scattering effect and increase surface roughness. All of the above-mentioned factors contribute to the occurrence of the secondary peak and a relatively wide FWHM bandwidth of Δf=2 THz, which is far higher than the ideal FWHM bandwidth of 0.2~0.3 THz. By using a laser that generate high-quality Gaussian beam, the above issues are expected to be resolved, and thus the secondary resonant transmission peak can be removed and the FWHM bandwidth of the LMF surface can be much narrower, which will facilitate the design and fabrication of narrow-band THz filter.

Table 1 shows the combined photoelectric properties for LMF surfaces for Pattern 1 and Pattern 2. Both of the visible transmittance and sheet resistance were measured for three times at various locations on a specimen and the average value with standard deviation was reported. It can be found that the two surfaces exhibit a visible transmittance of ~60%, a sheet resistance of ~20-30 Ω/sq and a specific resonance frequency with ~2 THz FWHM bandwidth.

While not wishing to be bound by any specific theory, it is believed that the reason that the visible transmittance of the LMF surfaces fabricated on the quartz substrate is lower than that on the glass substrate could be attributed to: 1. The visible transmittance of quartz substrate is slightly lower than that of the glass substrate; 2. The thickness of the as-deposited films on different substrates is slightly different. In addition, it should be noted that even though the areal density of Pattern 2 is larger than that of Pattern 1, the visible transmittance of Pattern 2 is larger than that of Pattern 1 and the sheet resistance of Pattern 2 is higher than that of Pattern 1. This could be attributed to the fact that the thickness of the Cu film deposited on the quartz substrate of Pattern 1 is slightly higher than that of Pattern 2. Thus the visible transmittance of the as-deposited Cu film of Pattern 2 is around 4% higher than that of Pattern 1 and the sheet resistance of the as-deposited Cu film of Pattern 2 is 3.4 Ω/sq higher than that of Pattern 1. Therefore, even though the areal density of Pattern 2 is larger, the visible transmittance and sheet resistance of Pattern 2 are larger and higher than those of Pattern 1 due to the difference between the visible transmittance and sheet resistance of the as-deposited Cu films used for the two different patterns. Therefore, although the three combined photoelectric properties are not optimal and need further refinement, this LMF method has shown its great potential for fabrication of the multi-functional THz components.

TABLE 1

|  | Visible transmittance | Sheet resistance | Resonance frequency | FWHM width |
|---|---|---|---|---|
| Pattern 1 | 56.9 ± 0.4% | 16.3 ± 1.8 Ω/sq | 1.09 THz | 1.94 THz |
| Pattern 2 | 57.2 ± 0.6% | 31.9 ± 3.2 Ω/sq | 0.90 THz | 2.29 THz |

From the THz spectra of two patterns, it is found that the peak transmission intensity of Pattern 1 is 67.4%, which is slightly higher than the peak intensity of 64.5% for Pattern 2. This could be attributed to the slight difference between the thicknesses of Cu films used for the two patterns. The Cu film for Pattern 1 is slightly thicker than that of Pattern 2. As a result, a higher peak transmission intensity is observed for the THz spectrum of Pattern 1 rather than Pattern 2. This phenomenon indicates that metal thickness plays a key in determining efficient THz transmission through laser patterned metal film. With higher metal film thickness, higher THz transmission intensity is facilitated. In addition to THz transmission performance, the electrical conductivity will be higher while the visible transmittance will be lower with higher film thickness, as discussed in the previous section. To balance the three properties, proper metal film thickness should be used in the LMF experiments. It is also found that the locations of resonant transmission peaks for Pattern 1 and Pattern 2 are different since different areal densities were used for these two patterns during LMF experiments. The experimental results indicate that areal density plays a key role in tuning the THz transmission of the LMF surface since the laser patterned hole spacing is determined by areal density which is the key parameter in Equation 1. Literature work indicates that the physically relevant parameter that determines extraordinary THz transmission properties is the hole size for a fixed hole periodicity. However, this work demonstrates that areal density can also play a role in modulating the THz transmission properties given the same laser patterned hole size. Therefore, metal film thickness and areal density are two key parameters that determines the combined performance of visible transmittance, electrical conductivity and THz filtering effect.

Processing Efficiency

The LMF process developed in this work is highly time-efficient and cost-effective as it only involves two simple steps for the three integrated functionalities. The other state-of-art nanofabrication methods usually involve many steps, which are time-consuming and costly for large area processing. For example, photolithography method has been applied for fabricating THz transmission subwavelength hole arrays, which involves at least six steps including ultrasonic cleaning, spin coating, soft-bake, UV exposure, chemical development and reactive ion etching. The production time for such a metasurface with metallic hole array is at least one magnitude longer than the LMF process. Further, photolithography methods give metamaterials that are not transparent in the visible spectrum. Therefore, the LMF process described herein makes metamaterials that are superior to those made by photolithography.

One key advantage of the LMF process is that it utilized a laser beam diameter on the order of several hundreds of μm during laser scanning of the thin metal film. Thus the processing efficiency has been significantly increased compared with the existing research work done by other type of nanosecond laser, picosecond laser or femtosecond laser, which used a laser beam diameter on the order of only several μm. It is expected that the laser beam diameter could be further increased to several millimeters while maintaining the similar laser fluence to further enhance the processing efficiency. Furthermore it should be noted that the LMF process just used an affordable nanosecond laser with a repetition rate of 10 Hz and thus currently it took around one hour to fabricate the transparent conducting film with an area of 36 cm×36 cm. The processing speed can be significantly further optimized by using lasers with higher repetition rate. If a laser at 10 kHz pulse was used, the processing time could be reduced to 6 seconds. It should also be noticed that even with such high laser fluence, no structural deformation and damage were found on the quartz substrate. All of the above-mentioned advantages of this LMF process will render more practical treatment of glass-based materials to produce multi-functional THz components for various applications.

Optical Transmittance Measurement

The optical transmittance of laser patterned microhole array was measured using a UV-Vis spectrometer (USB4000, Ocean Optics Co.) with normal incidence. The UV-Vis spectrometer measures the transmittance of the specimen surface in the wavelength range of 400~1000 nm. Before transmittance measurement, calibration of the transmittance scale was performed by measuring the transmittance through air. Then the specimen was placed on the optical path of normal incidence for the actual transmittance measurement. During the transmittance measurement, light from a visible and near-infrared light source (HL-2000; Ocean Optics Co.) was fed through the illuminating fiber-optic probe, directed through the specimen placed on top of the pinhole, and into the quartz fiber-optic probe coupled to a USB4000 spectrometer. OceanView® software was utilized to process and visualize the transmittance measurement results. Each specimen surface was measured for three times at various locations, and the averaged spectral transmittance is obtained.

THz-Time Domain Spectroscopy

Experimental THz transmission spectra, were generated using THz-Time Domain Spectroscopy technique. THz-TDS is conducted by generating a coherent pulse of EM radiation at THz frequencies, passing the radiation through the sample of interest, and detecting the transmitted radiation in a time dependent manner. The THz-Time Domain Spectrometer is comprised of three main elements: a near infrared laser, a THz emitter, and a time domain detection system.

A 1000D TeraView spectrometer (TeraView Limited, Cambridge, UK) was used to collect the THz-TDS data. This instrument utilizes a Ti:Sapphire (Ti:Al2O3) near infrared laser to generate a femtosecond laser pulse over a period less than 100 fs at a wavelength of 800 nm. This pulse is then split into a probe and pump beam. The pump beam strikes a polarized, low temperature grown GaAs semiconductor, quickly creating electron-hole pairs to generate a broadband of electromagnetic radiation. The broadband nature of this radiation makes it well suited for solid-phase measurements where spectral bands are relatively broad compared to gas-phase spectra.

Time information is collected using a delay line. The probe beam is directed to the delay line, where the delay line position allows for sampling of the time domain signal in a discrete and time-integrated manner. The 1000D TeraView spectrometer is equipped with a photoconductive (PC) detector. This detector operates by utilizing low temperature grown GaAS semiconductor (band gap ~1.5 eV at STP). After the pump beam passes through the sample compartment and the probe beam passes through the delay line, they are directed to illuminate the detector. The higher energy probe beam generates electron-hole pairs in the semiconducting PC material, while the mobile electrons are accelerated by the oscillating electric field vector of the THz radiation, creating a measurable current between the antenna electrodes of the detector assembly. The semiconducting material used in the Teraview 1000D spectrometer is GaAs with 1.5 eV band gap at room temperature.

Each THz-TDS spectrum was collected as 1800 co-added scans attained over one minute. Three air-reference spectra and nine sample spectra were collected for each quartz sample. Confounding water vapor lines were avoided by purging the sample compartment with dried air. Time-domain spectra were processed subsequently to achieve frequency-domain absorption spectra. Each time-domain spectrum was truncated just before the first etalon and the truncated time-domain spectrum data was zero-filled to 8192 ($2^{13}$). A boxcar apodization function was applied prior to the fast Fourier transform to yield the corresponding frequency-domain electric field spectrum. Transmission spectra were then calculated as the ratio of the sample to air electric field spectra in the frequency domain. The resolution of the resulting spectra was 0.036 THz over a spectral range of 0.3~3 THz.

What is claimed is:

1. A composite comprising:
   a continuous metal film having a first major surface and opposed second major surface, the continuous metal film comprising a micro-hole array pattern extending from the first major surface to the opposed second major surface;
   a dielectric substrate comprising a first major surface and opposed second major surface;
   the metal film first major surface located on at least a portion of the dielectric substrate first major surface;
   wherein the continuous metal film has a sheet resistance of at least 15 Ω/sq, an optical transmittance of at least 60% within the visible spectrum, and tunable bandpass filtering effect in the THz frequency range.

2. The composite of claim 1, wherein the metal film has a thickness of less than about 100 nm.

3. The composite of claim 1, wherein the metal film is formed from copper (Cu), aluminum (Al), silver (Ag) or gold (Au).

4. The composite of claim 1, wherein substantially the entire metal film has a sheet resistance of at least 15 Ω/sq, an optical transmittance of at least 70% within the visible spectrum, and tunable bandpass filtering effect in the THz frequency range.

5. The composite of claim 1, wherein the dielectric substrate is formed from quartz or glass.

6. The composite of claim 1, wherein the THz transmission is at least about 30% from about 0.5 THz to about 3 THz.

7. The composite of claim 1, wherein the THz frequency range is from about 0.3 THz to about 3 THz.

8. The composite of claim 1, wherein the optical transmittance is at least 70% from about 380 nm to about 700 nm.

9. The composite of claim 1, wherein the metal film and the dielectric substrate are in direct contact.

10. An article comprising the composite of claim 1.

11. The article of claim 10, wherein the article is a THz device.

12. The article of claim 10, wherein the article is at least a portion of an automotive window.

13. A method of making the composite of claim 1, the method comprising:
    depositing the metal film on the substrate first major surface, and
    laser patterning at least a portion of the metal film second major surface.

14. The method of claim 13, wherein the metal film is deposited using e-beam evaporation or magnetron sputtering.

15. The method of claim 13, wherein substantially the entire surface of the substrate is covered by the metal film.

16. The method of claim 13, wherein the laser patterning comprises patterning at least a portion of the metal film with a laser beam from a 1,064 nm wavelength Q-Switched Nd:YAG nanosecond laser.

17. The method of claim 13, wherein the laser patterning comprises patterning at least a portion of the metal film with a laser pulse lasting at least 1 ns.

18. The method of claim 13, wherein the laser patterning comprises patterning at least a portion of the metal film with a laser pulse having a pulse energy of at least 1 mJ.

19. The method of claim 13, wherein the laser patterning removes at least a portion of the metal film without substantially thermally damaging the substrate.

20. The method of claim 13, wherein the laser patterning is carried out at a processing speed of at least 1 mm/s and a repetition rate of at least 10 Hz.

21. The method of claim 20, wherein the laser patterning is carried out at a repetition rate of at least 10 KHz.

* * * * *

UNITED STATES PATENT AND TRADEMARK OFFICE
CERTIFICATE OF CORRECTION

PATENT NO. : 11,808,961 B2
APPLICATION NO. : 16/740024
DATED : November 7, 2023
INVENTOR(S) : Ding et al.

It is certified that error appears in the above-identified patent and that said Letters Patent is hereby corrected as shown below:

On the Title Page

In item (54), in "Title", in Column 1, Line 3, delete "METAMATERTALS" and insert --METAMATERIALS-- therefor In the Specification In Column 1, Line 3, delete "METAMATERTALS" and insert --METAMATERIALS-- therefor In Column 7, Line 36, delete "X." and insert --X,-- therefor In Column 9, Line 53, delete "60%" and insert --~60%-- therefor In Column 12, Line 27, delete "$\Delta f=2$ THz," and insert --$\Delta f \approx 2$ THz,-- therefor In the Claims In Column 16, Line 23, in Claim 13, delete "surface," and insert --surface;-- therefor In Column 16, Line 48, in Claim 21, delete "KHz." and insert --kHz.-- therefor Signed and Sealed this
Nineteenth Day of November, 2024

Katherine Kelly Vidal
*Director of the United States Patent and Trademark Office*